Patented Jan. 20, 1925.

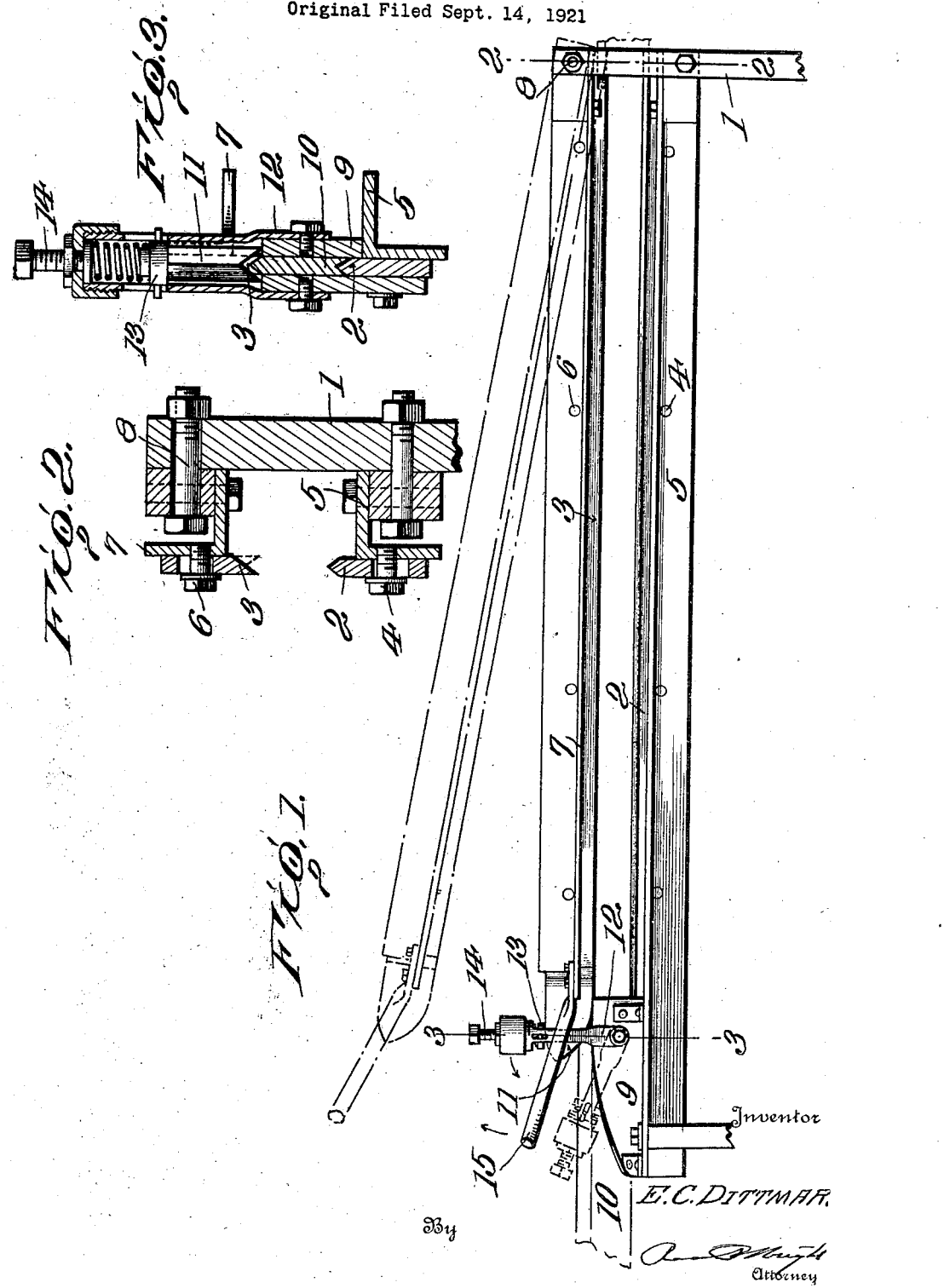

1,523,475

UNITED STATES PATENT OFFICE.

ELMER C. DITTMAR, OF WILLIAMSPORT, PENNSYLVANIA, ASSIGNOR TO THE CROOKS-DITTMAR COMPANY, OF WILLIAMSPORT, PENNSYLVANIA, A CORPORATION OF PENNSYLVANIA.

GUIDING MEANS FOR FLOORING-FINISHING MACHINES.

Application filed September 14, 1921, Serial No. 500,658. Renewed June 17, 1924.

*To all whom it may concern:*

Be it known that I, ELMER C. DITTMAR, a citizen of the United States, residing at Williamsport, in the county of Lycoming and State of Pennsylvania, have invented certain new and useful Improvements in Guiding Means for Flooring-Finishing Machines, of which the following is a specification, reference being had therein to the accompanying drawing.

This invention relates to certain new and useful improvements in guiding means for strips of lumber in coating and finishing machines and is an improvement upon the guiding means shown and described in my application Serial No. 314,464, filed July 31, 1919, the object being to provide a guide way formed of a pair of guide members, one of which is movable in respect to the other in order to allow the upper guide to be raised to release the strip which has jammed in the guide way in its passage through the machine.

Another object of my invention is to yieldably hold the movable guide in respect to the fixed guide which allows the guide to yield slightly so as to accommodate the irregularities in strips of lumber passing through said guide way.

Other and further objects and advantages of the invention will be hereinafter set forth and the novel features thereof defined by the appended claims.

In the drawings,

Figure 1 is a side elevation of a guide way for guiding strips of lumber in a machine for finishing flooring;

Figure 2 is a section taken on line 2—2 of Figure 1; and

Figure 3 is a section taken on line 3—3 of Figure 1.

In my companion application covering the machine for finishing flooring, the material being finished is passed through a guide way formed of fixed guides and I have found in practice that imperfect strips jam in the guide way which necessitates stopping the machine and removing the strip under great difficulties and the object of this invention is to provide means for instantaneously releasing the strip when it jams so that it can be withdrawn.

In the drawing 1 indicates a suitable support on which are mounted superposed guides 2 and 3 which are provided with edges corresponding to the shape of the strip being operated on and as herein shown the guide 2 is provided with substantially V-shaped tongue and the guide 3 with a substantially V-shaped groove and it is, of course, understood that I do not wish to limit myself to the particular construction of guides used as I am aware that various constructions of guides can be employed without departing from the spirit of my invention.

The guide 2 is adjustably mounted as shown at 4 on an angle iron 5 carried by the support 1 and the guide 3 is adjustably mounted as shown at 6 on an angle iron 7 pivotally mounted on a bolt 8 on the upper end of the support 1 in order to allow the guide 3 to be raised as shown in dotted lines in Figure 1. The end of the guide 3 is cut away as shown in Figure 2 so as to allow the same to be raised without interfering or engaging the strip in the guide way.

A feeding throat 9 is formed at the opposite end of the guide way in which the strip 10 is inserted and forced in the guide way. The upper guide 3 is rounded as shown at 11 and pivotally mounted on the throat 9 is a yoke 12 provided with a spring plunger 13 adapted to engage the end of the guide 3 as clearly shown in Figures 1 and 3, the tension of the plunger being adjusted by a screw 14.

By this construction the upper guide which rests on the edge of the throat 9 is yieldably held in position in respect to the lower guide so that the same can yield to accommodate the unevenness of a strip of lumber in passing through the same. When a strip of lumber is warped or is not uniform in shape, it sometimes jams in passing through a guide way of this kind and in such a case the yoke 12 is thrown off from over the end of the upper guide and the handle 15 is grasped by the operator and the upper guide is raised to a position as shown in dotted lines in Figure 1, which releases the strip of lumber in order to allow the same to be withdrawn.

While I have shown certain details of construction, I do not wish to limit myself to any particular manner of mounting the guides to form the guide way or for holding the movable guide yieldable in respect to the fixed guide as I am aware that various changes can be made without departing from the spirit of my invention as my invention consists broadly in forming a guide way for supporting and guiding a strip of lumber to be finished formed of a pair of guides, one of which is yieldably held in position in respect to the other and in such a manner that it can be moved away from the fixed guide in order to allow a strip which is jammed in the guide way to be removed.

When a machine of the kind described in the application referred to is provided with a guide way constructed in accordance with this invention and a strip of lumber is inserted in the guide way, the movable guide will yield to a certain extent so as to allow the strip to move freely in the guide way and yet be held in its proper position to be acted on by the machine for coating the surface thereof and when the strip is forced into the machine of such a size and shape that it jams therein, the movable guide way can be readily moved away from the fixed guide member which enables the strip to be removed.

What I claim is:—

1. A guide way for wood finishing machines comprising spaced guides, one of the guides being movably mounted in respect to the other guide and yielding means for holding said movable guide at a predetermined position in respect to the fixed guide.

2. A guide way for wood finishing machines comprising upper and lower guides, the upper guide being movably mounted in respect to the lower guide and a yoke carried by the lower guide adapted to embrace the upper guide having a spring pressed plunger for yieldingly holding said movable guide in respect to the lower guide.

3. A guide way for finishing machines formed of a pair of spaced guide members, one of said guide members being pivotally mounted and means for holding said pivotally mounted guide parallel to the fixed guide member.

4. A guide way for wood finishing machines comprising a pair of spaced guide members, one of said guide members being pivotally mounted and capable of swinging away from the other guide member, a yoke carried by the fixed guide member adapted to embrace the pivotally mounted guide member and a spring plunger carried by said yoke for yieldingly holding said pivoted guide member in respect to the fixed guide.

5. A guide way for wood finishing machines formed of a pair of adjustably mounted guide members, one of said guide members being pivotally mounted in respect to the other guide member and means for yieldingly holding said pivotally mounted guide in respect to the fixed guide.

In testimony whereof I hereunto affix my signature.

ELMER C. DITTMAR.